United States Patent [19]

Magel

[11] Patent Number: 5,223,971
[45] Date of Patent: Jun. 29, 1993

[54] LIGHT BEAM STEERING WITH DEFORMABLE MEMBRANE DEVICE

[75] Inventor: Gregory A. Magel, Dallas, Tex.

[73] Assignee: Texas Instruments Incorporated, Dallas, Tex.

[21] Appl. No.: 816,434

[22] Filed: Dec. 31, 1991

[51] Int. Cl.$^5$ .................. G02B 26/00; G02B 5/08
[52] U.S. Cl. .................. 359/295; 359/291; 359/847
[58] Field of Search ........... 359/290, 291, 295, 298, 359/319, 318, 847, 224

[56] References Cited

U.S. PATENT DOCUMENTS

| | | | |
|---|---|---|---|
| 3,701,586 | 10/1972 | Goetz | 359/295 |
| 3,746,785 | 7/1973 | Goodrich | 359/847 |
| 4,001,635 | 1/1977 | d'Auria et al. | 359/291 |
| 4,087,810 | 5/1978 | Hung et al. | 359/291 |
| 4,248,504 | 2/1981 | Albertinetti et al. | 359/295 |
| 4,492,435 | 1/1985 | Banton et al. | 359/295 |
| 4,566,935 | 1/1986 | Hornbeck | 359/291 |
| 4,638,309 | 1/1987 | Ott | 359/291 |
| 4,856,863 | 8/1989 | Sampsell et al. | 385/17 |
| 4,879,602 | 11/1989 | Glenn | 359/224 |
| 5,061,049 | 10/1991 | Hornbeck | 359/298 |
| 5,099,353 | 3/1992 | Hornbeck | 359/291 |
| 5,144,462 | 9/1992 | Otsuka et al. | 359/290 |
| 5,170,283 | 12/1992 | O'Brien et al. | 359/291 |

OTHER PUBLICATIONS

Goltsos & Golz, "Agile Beam Steering Using Binary Optics Microlens Arrays", Optical Engineering, Nov. 1990, vol. 29, No. 11.

*Primary Examiner*—Bruce Y. Arnold
*Assistant Examiner*—Evelyn A. Lester
*Attorney, Agent, or Firm*—Julie L. Reed; James C. Kesterson; Richard L. Donaldson

[57] ABSTRACT

A deformable membrane type of spatial light modulator may be modified and used with a lens for beam steering applications. A reflective membrane is deformed by one or more of a multiplicity of underlying address electrodes, such that it has a different center of curvature depending on which electrode is being energized. An incoming beam is incident on the membrane and reflected from it. A lens collimates light reflected from the membrane so that a beam is reflected in a desired direction relative to the incoming beam.

16 Claims, 4 Drawing Sheets

LIGHT BEAM STEERING WITH DEFORMABLE MEMBRANE DEVICE

RELATED PATENT APPLICATIONS

The following patent application is related to the present application, and is incorporated by reference herein:

U. S. Pat. Ser. No. 07/676,688, "Integrated-Optic Waveguide Devices and Method".

TECHNICAL FIELD OF THE INVENTION

This invention relates to optics, and more particularly to steering a beam of light by electrically shifting the center of curvature of a deformable membrane to change the reflection angle of an incoming beam.

BACKGROUND OF THE INVENTION

Optical beam steering involves redirecting a beam of light to a predetermined direction. More complicated beam steering applications involve redirecting the beam to a continuous one or two dimensional path, i.e., a scan or trace. Such applications include optical processing, laser scanning such as for laser printers, and optical memories.

Many existing beam steering devices operate on some principle of moving a lens or mirror to change the direction of a transmitted or reflected beam. One existing beam steering method involves shifting one layer of transmissive lenses with respect to another layer of lenses. This method is discussed in an article entitled "Agile Beam Steering Using Binary Optics Microlens Array", by W. Goltsos and M. Holz, *Optical Engineering*, pages, 1392-97, November 1990. Other optical beam steering devices direct the beam with spinning mirrors. A problem with such devices is that they must provide some mechanical means for providing translational or rotational motion to the lens or mirror. Thus, they are limited in speed of operation and susceptible to mechanical failure.

An alternative approach to beam steering is the use of spatial light modulators (SLM's). SLM's are typically configured as one or two dimensional arrays of individually addressable optical elements. A common application of SLM's is in display systems, in which these elements represents pixels of an image and modify either the amplitude or the phase of light distribution within the optical system. SLM's can be divided into various types, including electro-optic, magneto-optic, liquid crystal, and deformable mirror devices. Various types of SLM's are discussed in the background of U.S. Pat. No. 4,956,619, which is incorporated by reference herein.

For beam steering, SLM's receive an input beam and the pixel elements are micro-mechanically moved to redirect the beam. An advantage of using spatial light modulators for beam steering is that no translational or rotational motion of a large external lens or mirror is required. The directionality is provided by reflecting the light from a stationary modulator that changes its phase, position, or shape. Another advantage is that SLM's are easily manufactured in sizes appropriate for the size of light beams used for communications. Advanced techniques for fabricating SLM's, including their addressing circuits, as integrated circuits have been developed.

A problem with using spatial light modulators for beam steering is the small size of the reflective elements. A single reflective element is typically smaller than the beam to be steered; and if an array of reflective elements is used, diffraction is a problem.

A need exists for an improved means for using spatial light modulator concepts for steering a beam of light.

SUMMARY OF THE INVENTION

One aspect of the invention is a light beam steering device. The main elements of the device are a membrane, an associated electrode circuit, and a lens. The device may be a single unit having these elements or an array. The membrane has a reflective surface, and is flexible and made from an electrically conductive material. The electrode circuit underlies the membrane, spaced under the membrane such that the membrane may deform toward the electrode circuit. The configuration of the electrode circuit depends on the desired directionality of the beam steerer. For example, if the electrode circuit is comprised of elongated electrode strips, one-dimensional steering is facilitated. If the electrode circuit is an area array of point electrodes, two-dimensional steering is facilitated. Spacers are used to support the membrane above the electrode circuit. The lens is spaced above said membrane, and has a power appropriate for maintaining the collimation of a beam of light reflected from the membrane.

The above description is for a membrane that deforms in a concave shape, away from a negative lens. If a transparent electrode circuit is placed between the membrane and the lens, the membrane may deform in a convex shape toward a positive lens.

Other aspects of the invention involve the use of a deformable membrane to steer a beam of light, and methods of fabricating the beam steerer.

A technical advantage of the invention is that it does not require translational or rotational movement of a lens or mirror. Instead, a reflective membrane is electrically deformed to provide a changing mirror surface. The speed of operation is as fast as the addressing capability of conventional spatial light modulators. The device is easily fabricated using known silicon processing and etching techniques. In one embodiment, the lenses are assembled over a monolithic SLM; in another embodiment, the lenses are part of the monolithic structure of the entire device.

DETAILED DESCRIPTION OF THE INVENTION

Although the application of spatial light modulators for beam steering is not the "modulation" for which such devices are named, the use of the term "spatial light modulator (SLM)" is nevertheless used herein. As explained below, the invention involves the re-use of some SLM concepts. However, the invention has a number of different structural aspects, such as its electrode circuit and related optics, as well as operational differences.

In a departure from conventional applications, especially image generation, deformable membrane SLM's have been modified for waveguide applications. In particular, U.S. Pat. Ser. No. 07/676,688, "Integrated-Optic Waveguide Devices and Method", describes a device for controlling membrane deformation to produce various effects in a guided light wave. Light travels in a waveguide under the membrane rather than being reflected from it. However, many of the fabrication techniques discussed in U.S. Pat. Ser. No. 07/676,688, are applicable to the present invention, and that patent application is incorporated herein by reference.

Figure 1:
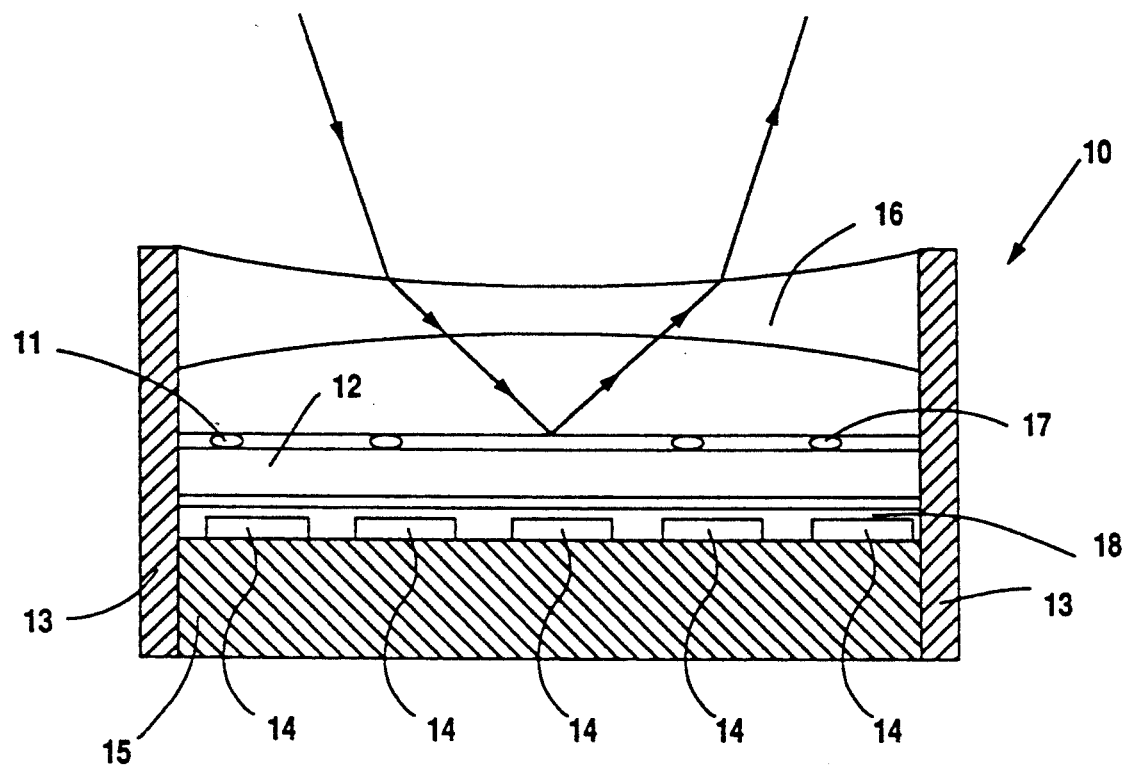
FIG. 1 is a cross sectional view of a single beam steering element.

FIG. 1 is a cross-sectional view of a single beam steering unit 10. Although FIG. 1, illustrates only one steering unit 10, a number of units 10 may be assembled together to form an array.

A membrane 11 is stretched over an air gap 12 between spacers 13. An example of a suitable material for membrane 11 is an aluminum alloy, although any flexible reflective material is suitable. Membrane 11 is typically in the range of $\frac{1}{4}$ to $\frac{1}{2}$ micron thick. The thickness of membrane 11 in relation to its area will determine its mechanical deformation properties. Membrane 11 is stretched over spacers 13 so that a surface tension is present. If beam steering unit 10 is part of an array, spacers 13 may be part of a spacer grid.

Membrane 11 is not limited to any one shape. Nor must it be supported by spacers 13 on all sides, or around its entire circumference if circular. As explained below, the size and support means for membrane 11 are factors which affect the shape of its deformation.

An underlying electrode circuit is comprised of a plurality of electrodes 14. As explained below, depending on the desired deformation shapes of membrane 11, electrodes 14 may be a linear or area array or some other pattern. In the preferred embodiment, an insulating layer 18 is placed over electrodes 14 to prevent actual contact of membrane 11 to electrodes 14 during operation.

Electrodes 14 may be formed by doping portions of substrate 15, or by depositing conductive material on substrate 15. Electrical connections from electrodes 14 to switching and data storage means, as well as to power, are not shown; in general, such features are known in the art of SLM's.

Lens 16 in conjunction with membrane 11 forms an afocal optical system. Incoming light beam passes through lens 16 to the reflective surface of membrane 11. After the beam is reflected from membrane 11, lens 16 again de-focusses the light beam so that it remains collimated. Lens 16 may be refractive or diffractive so long as it serves this collimation function. FIG. 1 shows only a single ray; the de-focussing and collimation of a beam comprised of a number of rays is not shown.

In effect, the negative power of lens 15 cancels the positive power of deformed membrane 11. As explained below in connection with FIG. 6, other embodiments of the invention use the other side of membrane 11, such that it has a negative power, in which case a positive lens would be used.

The spacing between membrane 11 and lens 16 is close in relation to their surface area. Membrane 11 when deformed, and lens 16 have approximately the same focal length.

A premise of the design and operation of beam steerer 10 is that electrodes 14 can be arranged and addressed in a predetermined manner to produce a desired reflection of an incident light beam. When light from the deformed membrane 11 passes through lens 16, the result is a reflected beam in a desired direction. It is then possible to provide a device that will direct an incident beam in any direction. The incident light may be reflected at different angles, depending on how membrane 11 is currently deformed.

In operation, when one or more electrodes 14 are energized, membrane 11 is pulled into air gap 12. More specifically, when a potential difference is applied between membrane 11 and one or more electrodes 14, the result is an electrostatic attraction between them. Membrane 11, which is supported by spacers 13, is attracted to the energized electrode(s) and is deformed toward them. Air gap 12 becomes smaller in volume because of the deformation of membrane 11. Air within air gap 12 can evacuate via air holes 17, which are placed in membrane 11 for that purpose or which are made during a fabrication process for etching out portions of the underlying spacer layer.

The construction and support of membrane 11, the configuration of electrodes 14, the number of electrodes 14 that are energized, and the voltage level applied to each electrode 14 are all factors affecting the deformation shape of membrane 11. In general, when one or more electrodes 14 are energized, the shape of membrane 11 will be determined by minimizing its surface energy.

Another consideration when designing beam steerer 10 for a particular application is the design of lens 15. Certain shapes and powers can be used to enhance a desired directionality.

Figure 2:
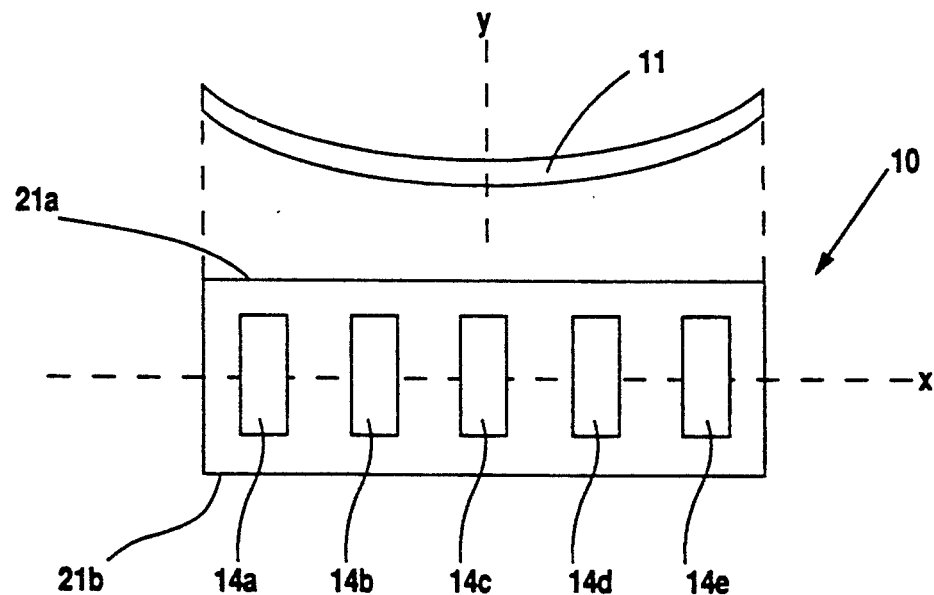
FIG. 2 is a plan view of one type of electrode circuit and a cross sectional view of a membrane.
Figure 4:
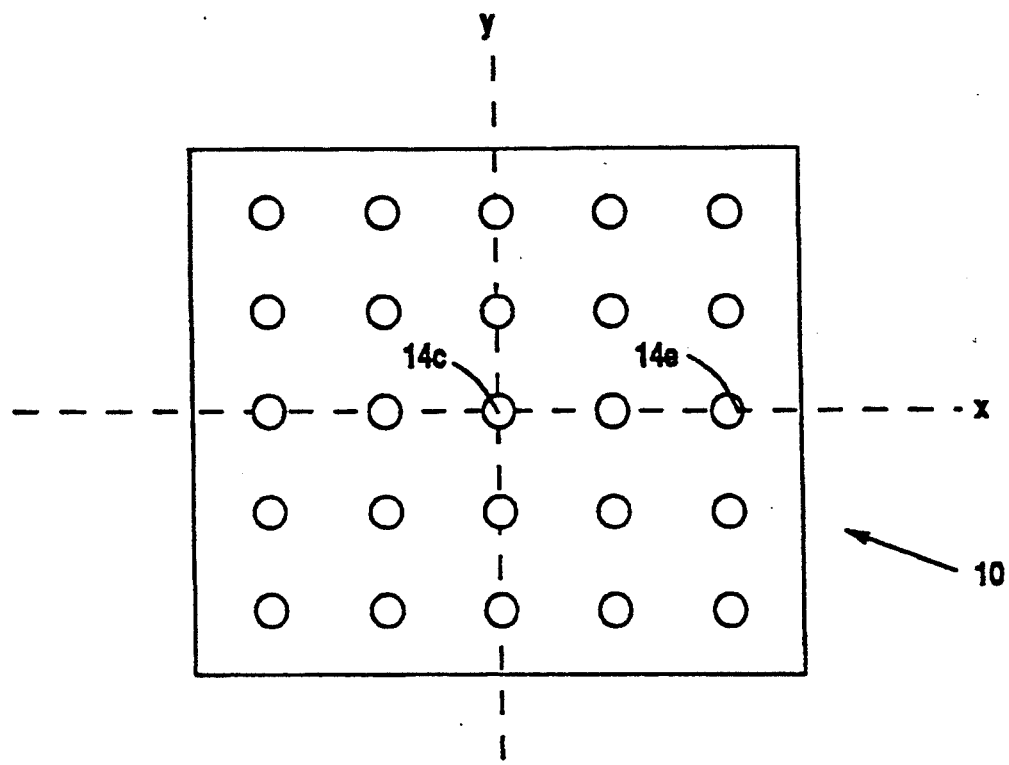
FIG. 4 is a plan view of an area array type of electrode circuit.

FIGS. 2 and 4 are examples of configuring membrane 11 and electrodes 14. Other configurations could be used, with the particular choice of membrane and electrode design depending on the desired directionality. As explained below, certain configurations are suitable for one-dimensional steering; other configurations are more suited for two-dimensional steering.

FIG. 2 is a plan view of a linear array of elongated electrodes 14a–14e for a rectangular membrane 11. Membrane 11 is shown at a ninety degree rotation from the electrode circuit to illustrate a cross section of its deformation shape when electrode 14c is energized. Electrodes 14a–14e are strips of conductive material, rather than point electrodes such as those of FIG. 4.

Figure 3A:
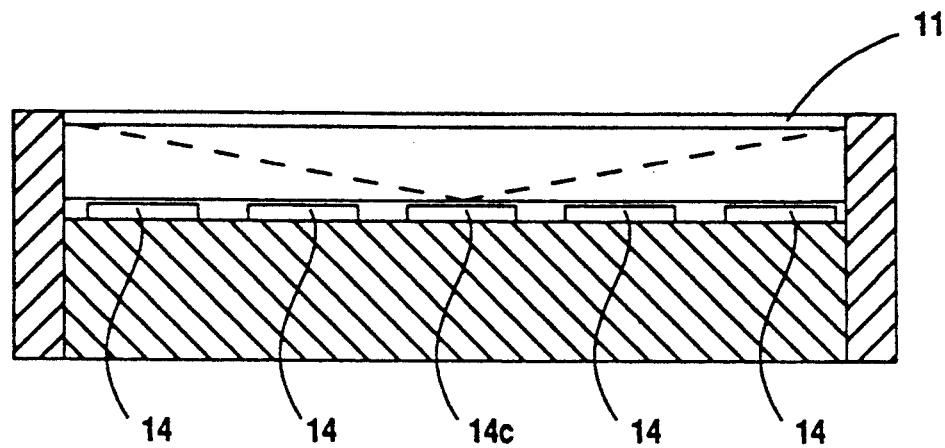
FIGS. 3A and 3B are cross sectional views of deformation of the beam steerer membrane, using the electrode array of FIG. 2.
Figure 3B:
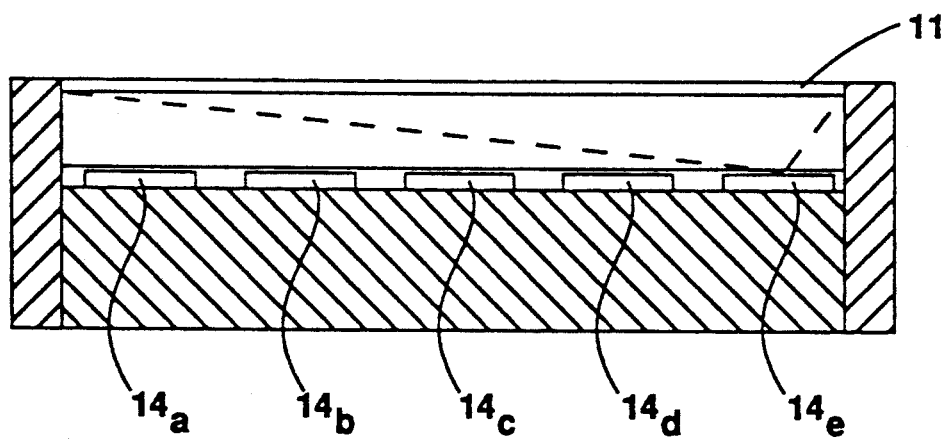

FIG. 3A is a cross sectional view of the effect of energizing a single electrode 14c of the array of FIG. 2. Lens 16 is not shown. Electrode 13c is beneath the center of membrane 11, thus membrane 11 deforms to a concave, "trough" shape. Its lowest part is above and corresponds to electrode 14c. FIG. 3B illustrates the effect of energizing electrode 14e, shifted along the x-axis from electrode 14c. Membrane 11 now deforms so that its lowest part is above electrode 14e.

The configuration of FIGS. 2, 3A, and 3B is suitable for one-dimensional beam steering. Membrane 11 is deformed as a "trough", having a line of curvature at the bottom of the trough, which corresponds to the energized electrode. The angle of reflection of an incoming light beam from membrane 11 will vary according to the shifted position of the bottom of the trough. To enhance one dimensional steering, membrane 11 could have its edges 21a and 21b free of support from spacers 13. Lens 16 could be cylindrical, with power in the dimension in which membrane 11 is curved.

FIG. 4 is a plan view of a square area array of address electrodes 14 for a square or circular membrane element 10. In this example, the area array is a 5×5 array of address electrodes 14. The arrangement of electrodes 14 correspond to x-y positions with an origin at the center of the surface area of membrane 11.

The configuration of FIG. 4 is suitable for two-dimensional beam steering. From one perspective, the deformation is like that illustrated in FIGS. 3A and 3B. However, because the energized electrode 14 is a point, rather than a strip, membrane 11 deforms to the general shape of a hemisphere, with its lowest point of curvature above the energized electrode 14.

Ideally, if electrodes 14 are energized one at a time, the deformed shape of membrane 11 resulting from energization of electrodes 14 would simply be a shifted line or center of curvature. However, although a certain electrode activation scheme may approximate such shifted curvature, the actual deformation may be more complex. To more closely approximate this ideal, the surface area of membrane 11 is large relative to the depth of its deformation. Also, electrodes 14 are arranged near the center point of membrane 11.

Other optical aberrations resulting from the deformation of membrane 11 may cause membrane 11 to have a different refractive power depending on which electrode 14 is being addressed. These differences in power can be determined and compensated by the shape of lens 15, or by the shape and size of the electrodes 14 and the voltages applied to them.

Also, holographic correction techniques can be used to correct aberrations from a desired directionality. Typically, for holographic correction, lenses 16 are formed in place. Holography over a deformed membrane 11 is used to synthesize the associated lens 16 so that a reflected beam is reconstructed as a collimated beam. Interference between a reference beam and an input beam will result in a hologram, which when illuminated with a single beam, will reconstruct a collimated beam. A holographic element may then be formed and used to correct the beam automatically. Alternatively, a computer-generated hologram could be formed by etching or deposition.

The examples of beam steerer 10 discussed so far have been directed to single units rather than arrays. A beam steerer comprised of a single element 10 could be used if membrane 11 were sufficiently large to accommodate the cross-section of the beam to be steered. However, this is not usually the case; an array of beam steering elements 10 is used when the beam of light to be steered is larger than the surface area of membrane 11. The size of the array depends on the size of the beam. Ideally, the spacing between membranes 11 and associated lenses 15 of the array is minimized to permit a high percentage of light capture.

Figure 5:
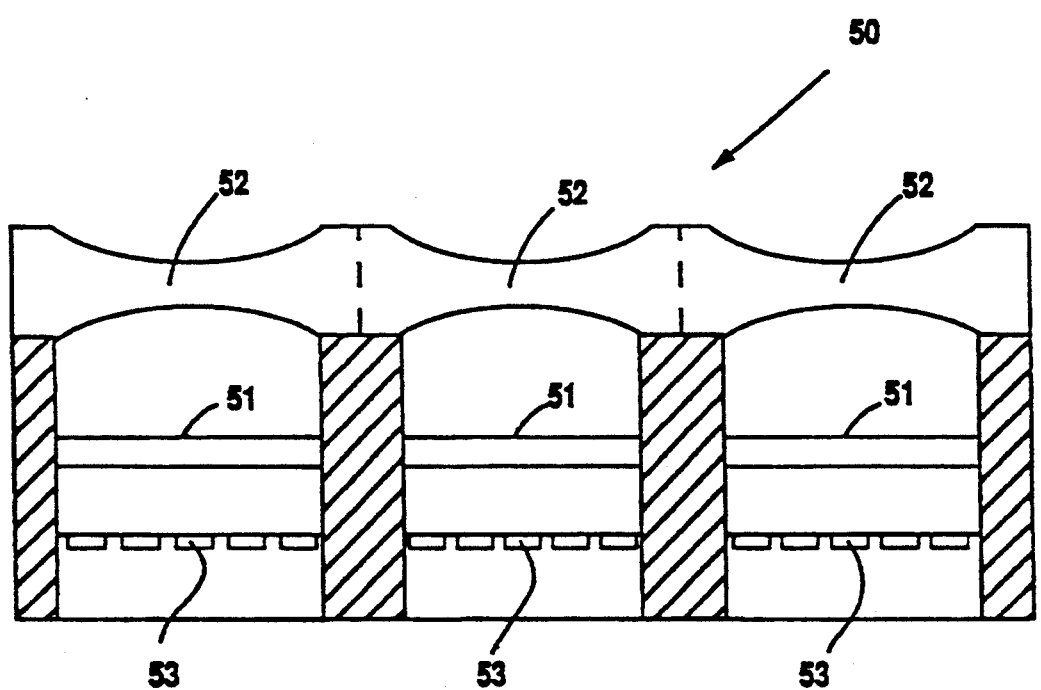
FIG. 5 illustrates a first array embodiment of the beam steerer.
Figure 6:
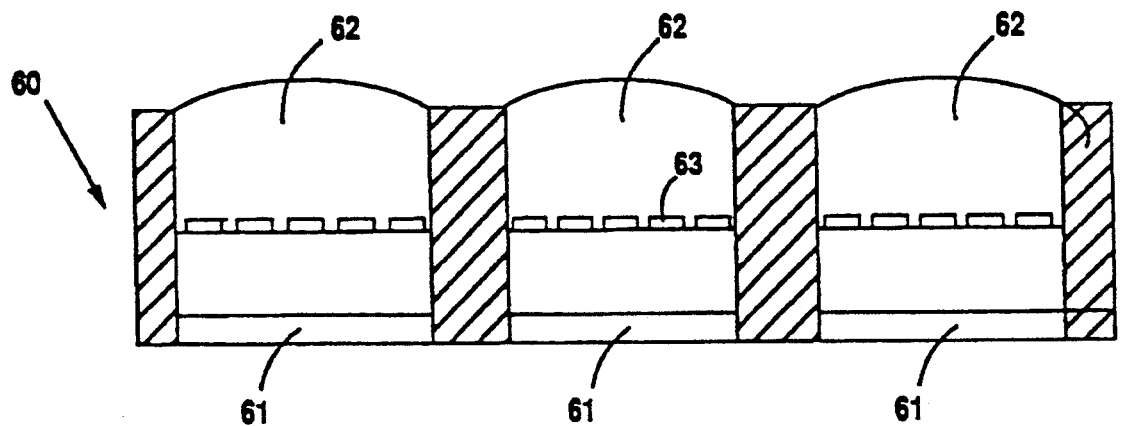
FIG. 6 illustrates a second array embodiment of the beam steerer.

FIGS. 5 and 6 illustrate embodiments of a beam steerer comprised of multiple beam steering elements 10. For arrays, membranes 11, their associated electrodes 14, and lenses 16, can be constructed as layers.

FIG. 5 illustrates a first array embodiment of a beam steerer 50, having multiple membranes 51 and associated lenses 52 and electrodes 53. The circuit of electrodes 53 associated with each membrane 51 may have the configuration of FIG. 2 or of FIG. 4, or any other configuration for producing a desired directionality.

Each lens 52 of steerer 50 is a concave (negative) lens. The array of lenses 52, like the single lens 16 of the embodiment of FIG. 1, recollimates the light beam after reflection from membranes 11. Thus, after reflection, the light follows a directed path instead of being diverged. Like lens 16, lenses 52 may be refractive or diffractive. In the case of a diffractive array, etching or deposition may he used to form lines 52 simultaneously.

FIG. 6 illustrates another embodiment of a beam steerer 60, having multiple membranes 61 and associated lenses 62 and electrodes 63. In this embodiment, the convex side of membrane 11 is used to reflect the incoming light beam. Accordingly, lenses 62 are positive lenses. As explained below, lenses 62 may be formed by shaping convex surfaces on a transparent material. All refraction occurs at the surface of lenses 62. Lenses 62 could also be comprised of diffractive lenses. Electrodes 63 are transparent, so as to not interfere with incoming and outgoing light.

The advantage of the embodiment of FIG. 6 is that it can be fabricated from a single piece of substrate material. The membranes 61 and electrodes 63 are formed on one side of the substrate; the lenses 62 are formed on the opposing side.

Figure 7:
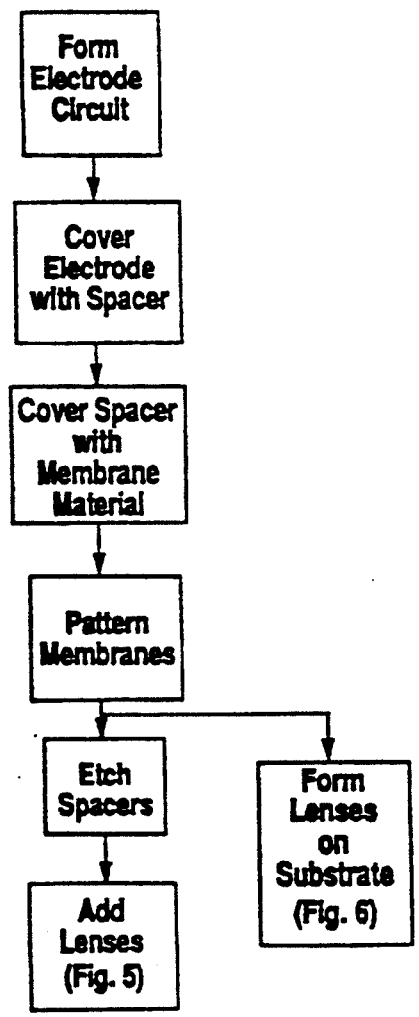
FIG. 7 illustrates a fabrication process for the embodiments of FIG. 5 or 6.

FIG. 7 illustrates a fabrication process for forming the array beam steerer of FIG. 5 or FIG. 6. The method is essentially the same for both embodiments, with the variation being with respect to the monolithic lens capability in the embodiment of FIG. 6. Fabrication of a single beam steering element, such as steerer 10 of FIG. 1 is theoretically the same as for an array, but in a practical sense, an advantage of the invention is the ease in which arrays can be fabricated.

First, the electrode circuit is formed on a piece of substrate material. This may be accomplished with photoresist and etching into the desired pattern of electrodes 14. Alternatively, the substrate may be doped to define electrodes 14. An insulatory layer 18 may be then added over the electrodes 14.

The next step is forming spacers 13. Typically, the spacer layer is a polymer material that is easily etched while leaving sections behind with good selectivity.

The membrane layer is deposited on the spacer layer prior to etching, by sputtering or evaporating a thin tensile film of metallic alloy. This film is patterned and etched with an array of tiny access holes, such as the holes 17 of FIG. 1, through which a spacer layer can be etched. By using a selective etch, such as a plasma etch, portions of the spacer beneath the region of the membrane containing the access holes are removed, but the spacer material remains elsewhere to form spacers 13.

The lens layer may be formed by attaching lenses at an appropriate distance above the membrane. These lenses may be commercially available, such as the microlenses manufactured by Corning Incorporated.

Alternatively, in the embodiment of FIG. 6, the lens layer may be formed from or upon the same substrate as the rest of the device. As discussed above, the substrate material is transparent, and the lenses are simply shaped from or upon that material.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light beam steering device, comprising:
   a membrane having a reflective upper surface, wherein said membrane is flexible and made from an electrically conductive material, and said membrane has a pattern of tiny holes in said upper surface;
   an electrode circuit on a substrate underlying said membrane, wherein said electrode circuit is spaced under said membrane such that said membrane may deform toward such electrode circuit;
   spacers on said substrate for supporting said membrane above said electrode circuit and said substrate; and
   a lens spaced adjacent said membrane, having a power appropriate for collimating a beam of light reflected from said membrane.

2. The device of claim 1, wherein said membrane deforms to a concave shape with respect to said lens and wherein said lens is a negative lens.

3. The device of claim 1, wherein said lens is a refractive lens.

4. The device of claim 1, wherein said lens is a diffractive lens.

5. The device of claim 1, wherein said electrode circuit is between said membrane and said lens, rather than under said membrane.

6. The device of claim 1, wherein said electrode circuit is comprised of elongated electrode strips.

7. The device of claim 1, wherein said electrode circuit is an area array of point electrodes.

8. The device of claim 1, wherein said membrane, said electrode circuit, and said lens are duplicated as an array of such elements.

9. The device of claim 1, wherein said lens is cylindrical for enhancing a desired beam steering directionality.

10. A method of using a reflective deformable membrane for steering a light beam, comprising the steps of:
    selecting an electrode on a substrate near said membrane to be energized;
    energizing said electrode such that said membrane deforms to a curved shape on spacers above said substrate;
    directing a beam of light toward said membrane such that it is reflected from the reflective surface of said membrane at a predetermined angle as determined by said selection step; and
    collimating the reflected light beam after reflection.

11. The method of claim 10, and further comprising the step of repeating said steps for directing said light beam in a predetermined pattern.

12. The method of claim 11, wherein said energizing step is performed with an area array of electrodes to approximate a shifted center of curvature of said membrane.

13. The method of claim 11, wherein said energizing step is performed with strip electrodes to approximate a shifted line of curvature of said membrane.

14. A method of fabricating a beam steering device, comprising the steps of:
    forming an array of electrode circuits on a substrate, each electrode circuit having a predetermined pattern such that they may be used to selectively deform a membrane in a predetermined shape when said membrane is electrostatically attracted to one or more of said electrodes;
    forming spacers above said electrode circuit for supporting membranes of said beam steering device;
    forming an array of reflective, flexible, membranes between said spacers, spaced above said electrodes such that it may deform toward them; and
    placing a negative lens over each of said membranes, spaced a small distance apart from said membranes, designed for collimating a light beam reflected from the surface of said membranes.

15. The method of claim 14, and further comprising the step of compensating for aberrations in the deformation of said membranes that affect a desired directionality of said light beam.

16. A method of monolithically fabricating a beam steering device, comprising the steps of:
    forming an array of transparent electrode circuits on a first side of a substrate, each electrode circuit having a predetermined pattern such that they may be used to selectively deform a membrane in a predetermined shape when said membrane is electrostatically attracted to one or more of said electrodes;
    forming spacers under said electrode circuit for supporting membranes of the steering device;
    forming an array of reflective, flexible, membranes between said spacers, spaced apart from said electrodes such that said membranes may deform toward said electrodes; and
    forming positive lenses from said substrate on an opposing side of said substrate, wherein the distance of said lens from said membranes and the power of said lenses is such that light reflected from said membranes is collimated.

* * * * *